United States Patent [19]
Rader

[11] Patent Number: 5,867,140
[45] Date of Patent: Feb. 2, 1999

[54] DISPLAY SYSTEM AND CIRCUIT THEREFOR

[75] Inventor: Sheila M. Rader, Wildwood, Ill.

[73] Assignee: Motorola, Inc., Schaumburg, Ill.

[21] Appl. No.: 758,019

[22] Filed: Nov. 27, 1996

[51] Int. Cl.$^6$ .................................................. G09G 5/00
[52] U.S. Cl. .............................. 345/98; 345/1; 345/90; 345/100; 345/211; 345/214
[58] Field of Search .................... 345/1, 3, 113, 345/115, 211, 214, 90–100; 361/679, 681

[56] References Cited

U.S. PATENT DOCUMENTS

| | | | |
|---|---|---|---|
| 3,744,049 | 7/1973 | Luce | 340/336 |
| 3,972,040 | 7/1976 | Hilsum et al. | |
| 4,382,256 | 5/1983 | Nagata | |
| 4,646,081 | 2/1987 | Tsunoda | |
| 4,694,406 | 9/1987 | Shibui et al. | |
| 4,740,786 | 4/1988 | Smith | 340/784 |
| 4,744,046 | 5/1988 | Foster | |
| 5,091,832 | 2/1992 | Tortola et al. | 362/109 |
| 5,237,653 | 8/1993 | Noguchi et al. | 395/158 |
| 5,262,764 | 11/1993 | Inamori et al. | 345/115 |
| 5,500,654 | 3/1996 | Jujimoto | 345/132 |
| 5,598,565 | 1/1997 | Reinhardt | 395/750 |
| 5,629,715 | 5/1997 | Zenda | 345/3 |

FOREIGN PATENT DOCUMENTS

| | | |
|---|---|---|
| 0 474 231 A2 | 9/1991 | European Pat. Off. |
| 0 474 231 A2 | 3/1992 | European Pat. Off. |
| 0474231A2 | 3/1992 | European Pat. Off. |
| 0584358A1 | 3/1994 | European Pat. Off. |
| 0 678 987 A1 | 4/1995 | European Pat. Off. |
| 0 678 987 A1 | 10/1995 | European Pat. Off. |
| 0 811 866 A1 | 12/1996 | European Pat. Off. |
| 0 811 866 A1 | 12/1997 | European Pat. Off. |
| 4218179A1 | 12/1993 | Germany. |
| 95/01626 | 1/1995 | WIPO. |

*Primary Examiner*—Mark K. Zimmerman
*Assistant Examiner*—Vincent E. Kovalick
*Attorney, Agent, or Firm*—Randall S. Vaas

[57] ABSTRACT

A display system includes a display panel (200) having a full display screen area (303) upon which images can be generated for viewing. An image control circuit (400, 501) controls the operation of the display panel such that only a partial display field, or area, (305) is controlled to generate images in a first operating mode to conserve power and the full display screen area is controlled to generate images in a second operating mode.

23 Claims, 5 Drawing Sheets

DISPLAY SYSTEM AND CIRCUIT THEREFOR

FIELD OF THE INVENTION

The present invention pertains to displays, and more particularly to circuits for controlling the signal applied to a display panel.

BACKGROUND OF THE INVENTION

Display systems, such as liquid crystal display (LCD) systems, have been implemented using a central processing unit (CPU), a display image buffer, and a display driver driving a display panel. For large screen LCD displays, the CPU operates to copy data from the display image buffer and apply the data to the display driver in a pixel-by-pixel manner. The driver produces a voltage on the display panel that controls the pixels thereon to have a particular intensity and decay rate. The process of applying a voltage is done repeatedly, at timed intervals, and is known in the art as "refreshing the display."

Display systems for small panels require a proportionally smaller display image buffer than systems for larger display panels. Many systems for small display panels implement the display image buffer in the same integrated circuit (IC) as the logic circuitry for controlling the display panel, such buffer known as an internal buffer. This approach yields a much lower current drain than using an external memory device for the display image buffer. However, the size of the display panel that can be driven by the integrated buffer is limited by the die area available for the display image buffer on the IC. Another drawback with this approach is CPU access to the internal display image buffer is restricted. Because access is restricted, as the display gets bigger the CPU has a more difficult time changing the contents of the internal display image buffer fast enough to avoid flicker and hesitation during scrolling. Consequently, for display systems employing an internal buffer for a large display panel, it is difficult to scroll images on the display panel in a smooth consistent manner.

It is therefor desirable to provide a system for controlling a large display with improved current drain characteristics.

DETAILED DESCRIPTION OF THE DRAWINGS

Figure 1:
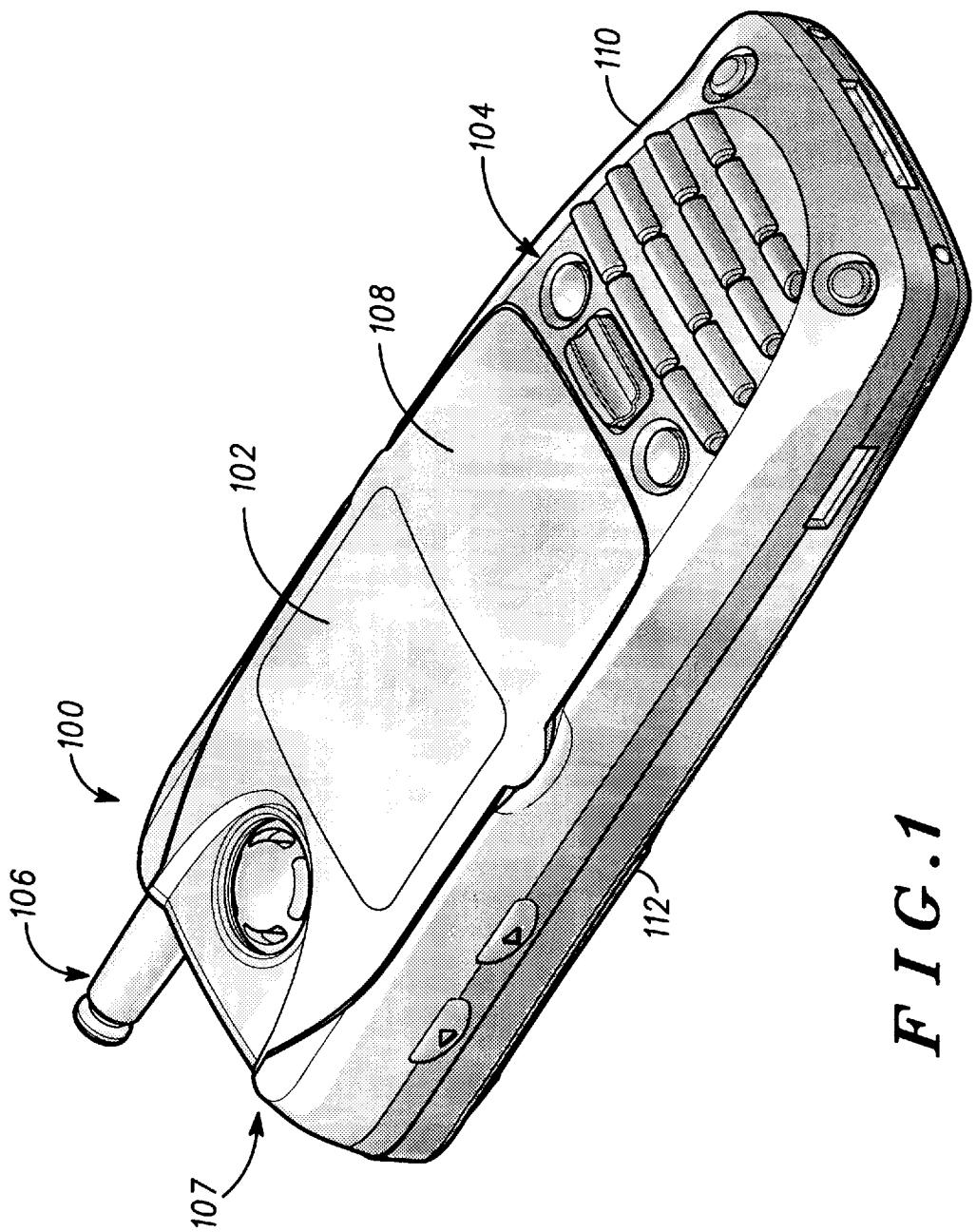
FIG. 1 is a front, top and side perspective view illustrating a device in a closed position.

A device 100 includes a display area 102, a keypad 104, an antenna 106, and a battery 112. The illustrated device 100 is a portable communication device, and more particularly a cellular radiotelephone. However, the present invention may find application in other devices incorporating a display, such as a pager, a two-way radio, a calculator, a portable computer, a palm top computer, a personal digital assistant (PDA), a video recorder, or the like, and as used herein "device" includes each of these and their equivalents.

Figure 2:
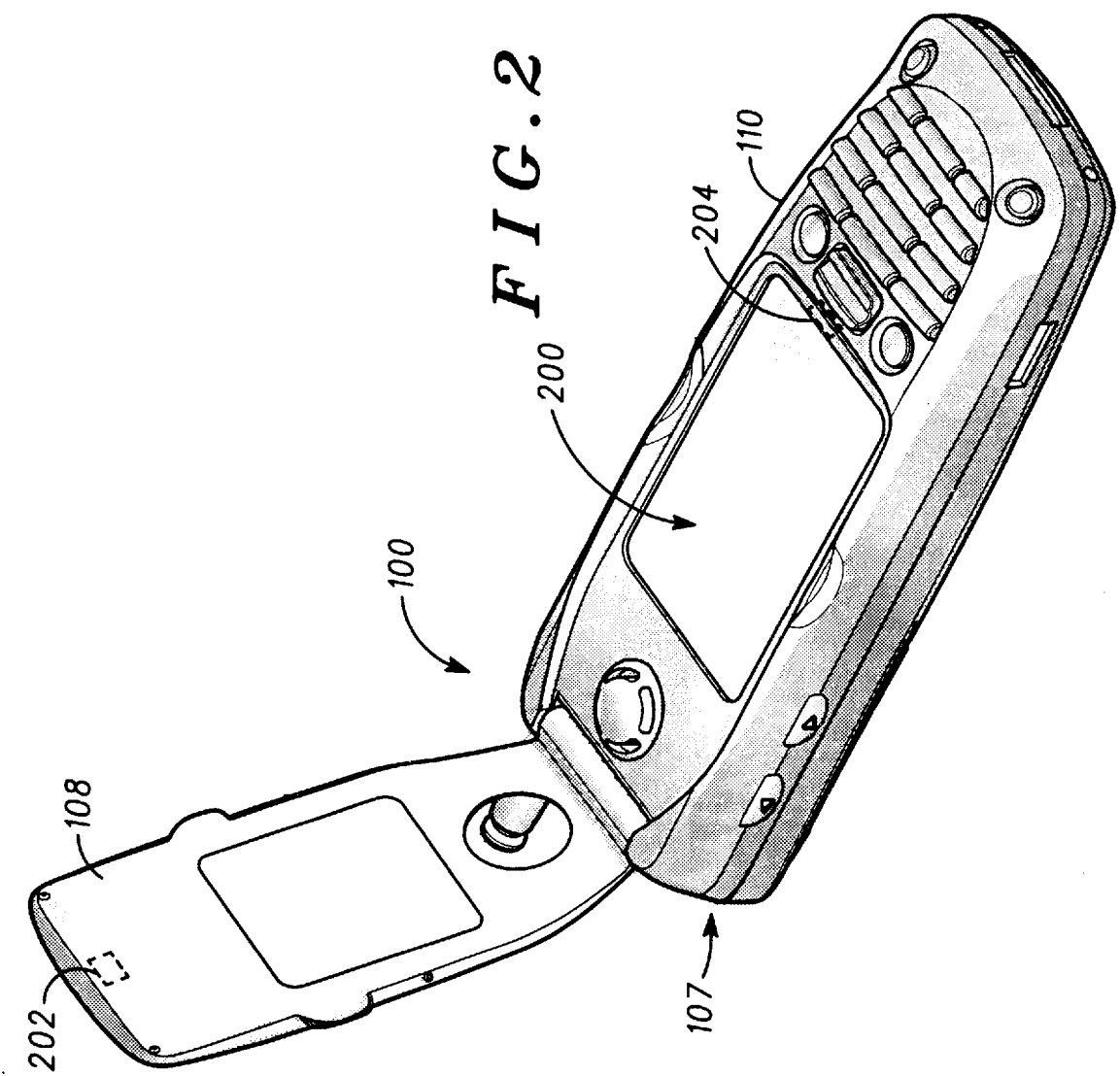
FIG. 2 is a front, top and side perspective view illustrating the device according to FIG. 1 in an open position.

A housing 107 of device 100 includes a housing portion 108, which is illustrated to be a cover, and a housing portion 110, which is illustrated to be the body. The housing 107 moves between a closed position (FIG. 1) and an open position (FIG. 2). The cover 108 and body 110 are movingly interconnected by any suitable connector, such as a hinge, a rail assembly facilitating sliding, or the like. The housing 107 is opened to expose the full viewing area of display panel 200 to a user.

The display area 102 of the cover 108 can be provided by a lens, such as a transparent polymeric element, or an opening that permits viewing of at least a portion of the display panel 200 while the cover 108 is closed. The lens is preferred as it protects the surface of display panel 200 when the cover is closed. The device 100 includes a magnet 202 in the cover 108 and a reed switch 204 in the body 110. The magnet and reed switch provide a sensor for detecting the open and closed positions of the housing 107. The sensor can be provided by any hall effect device, a mechanical switch, an optical device, or the like, and "sensor" as used herein refers to each of these and their equivalents.

A display system 300 (FIG. 3) is housed within body 110. The display system 300 generally includes a display control circuit 301 coupled to a display panel 200. The illustrated display panel 200 has a full display screen area 303, which is the entire viewable display area of the display panel screen. It also includes a partial display field 305 which is within, but smaller than, the full display screen area 303. The partial display field may be located in any region of the display screen, and it may be moved and/or its size altered, as will be described in greater detail herein below.

The display panel can have graphic capabilities. An exemplary display has a 15 level gray scale image provided by a 4 bit control signal for each pixel. The exemplary display has a full liquid crystal display (LCD) panel screen with a display area of 192 pixels by 272 pixels and a pitch of 120 dots/inch. However, the size of the display is not critical, and those skilled in the art will recognize that the display panel can have other sizes. The display panel can be implemented by any conventional display panel such as those commercially available from Epson Corporation or Optrex. The display panel 200 can be a single or multi-line display, monochrome or color.

The display system 300 comprises the display control circuit 301 and the display panel 200. The display control circuit 301 comprises a central processing unit (CPU) 312 coupled to a display image buffer 304 and a display driver 310. The display driver 310 includes a vertical, or column, driver 311 and a horizontal, or row, driver 313. The drivers 311 and 313 control the voltages applied to the columns and rows of display panel responsive to signals from CPU 312. The drivers can be implemented with any suitable commercially available drivers, such as those manufactured by Sharp Corporation.

The display image buffer 304 stores an image for the display panel. The display image buffer 304 is sufficiently large to store the required number of pixels to render an image over the entire area of display panel 200. The capacity in bytes of the display image buffer 304 can be determined using the following:

$$\text{bytes} = G * x * y / 8$$

where bytes=the capacity of the memory in bytes; G=the number of bits per pixel (1=monochrome; 2=4 level gray scale; 4=15 level gray scale);
x=number of pixels in a horizontal line;
y=number of pixels in a vertical line.
For example, for a display having 192 pixel columns, 272 pixel rows, and 15 level gray scale, the total memory required to generate an image over the entire area of display panel 200 is 26,112 bytes. To condense parts, a DRAM having a capacity of 2 Mbytes can be used to implement the buffer, and the buffer will be a portion of this memory. The rest of the DRAM can be used for other purposes not related to the display. The display image buffer 304 is easily accessible to the CPU 312 to permit dynamic movement, such as scrolling, of objects, such as icons, and real time plotting.

The display image buffer 304 is connected to the central processing unit (CPU) 312 by data bus 315. The CPU 312 stores images in display image buffer 304 that are to be displayed on the full display screen area 303 of the display panel 200. Four bit control signals for each pixel are sequentially copied out of the display image buffer 304 and applied to the display driver 310 by CPU 312. The CPU 312 may be implemented using any suitable commercially available controller, microprocessor, or digital signal processor (DSP), such as the CL-7110 commercially available from Cirrus Logic.

The CPU 312 receives inputs from the user input 314, which can include a touch pad (not shown) for display panel 200, keypad 104, other keys on the device, a microphone (not shown), or the like. The CPU 312 also receives inputs from sensors 316, which can include reed switch 204, an ambient light sensor (not shown), or the like. The CPU 312 may also include a software implemented sensor that monitors activity of the CPU and provides status information. Sensor as used herein includes all such detectors internal and external to the CPU and their equivalents.

One of the sensors is reed switch 204, which is closed when the cover 108 is open and open when the cover 108 is closed. The reed switch 204 connects a voltage to CPU 312 when it is closed, which occurs when the magnet on the cover 108 is remote from the reed switch. The voltage is thus applied through the reed switch 204 to the CPU 312 when the cover is open and not when the cover 108 is closed. The CPU 312 is thus responsive to the reed switch to sense whether the cover 108 is closed or open.

The CPU 312 also has an internal sensor (not shown) that detects inactivity. If the CPU 312 receives no inputs from the user input 314 and RF circuit 318 for a predetermined period of time, the CPU can enter a sleep mode.

The CPU 312 responds to these sensors 316 to control the display panel 200 to display an image only in the partial display field 305 when the phone enters a "sleep mode" due to inactivity of the processor, or when the phone is active while the cover 108 is closed. The full display mode can be automatically activated when the cover 108 is opened and the partial display mode can be automatically entered when the cover 108 is closed responsive to the inputs from the sensors.

The CPU 312 is coupled to display driver 310 by buses 317 and 319. The display driver includes a horizontal driver 313 and a vertical driver 311. The horizontal driver 313 controls the voltage input to the rows of pixels on the display panel 200. The vertical driver 311 controls the voltage input to the columns of pixels of the display panel 200. The vertical driver 311 and horizontal driver 313 can be implemented using any suitable commercially available drivers, such as those available from Sharp. These drivers receive pixel control signals from CPU 312 and output parallel control signals to the display panel 200.

In addition to the display system 300, the illustrated portable communication device includes a radio frequency (RF) circuit 318 coupled to an antenna 106 for communicating with a base station (not shown). The RF circuit 318 communicates with CPU 312 over a bi-directional communication bus 320 and with a base station (not shown) via antenna 106. The RF circuit and antenna 106 can be implemented using any suitable commercially available radio frequency circuitry.

The display system 300 is powered by battery 112. The battery voltage is regulated by voltage regulator 322. Those skilled in the art will recognize that the amount of power drawn by the display system 300 impacts on the amount of time that it will take to deplete the battery 112. It is therefore desirable to reduce the power consumption of portable device 100 by decreasing the power consumption of display system 300 to thereby increase the time that it takes to deplete the battery without increasing the size of the battery.

Figure 3:
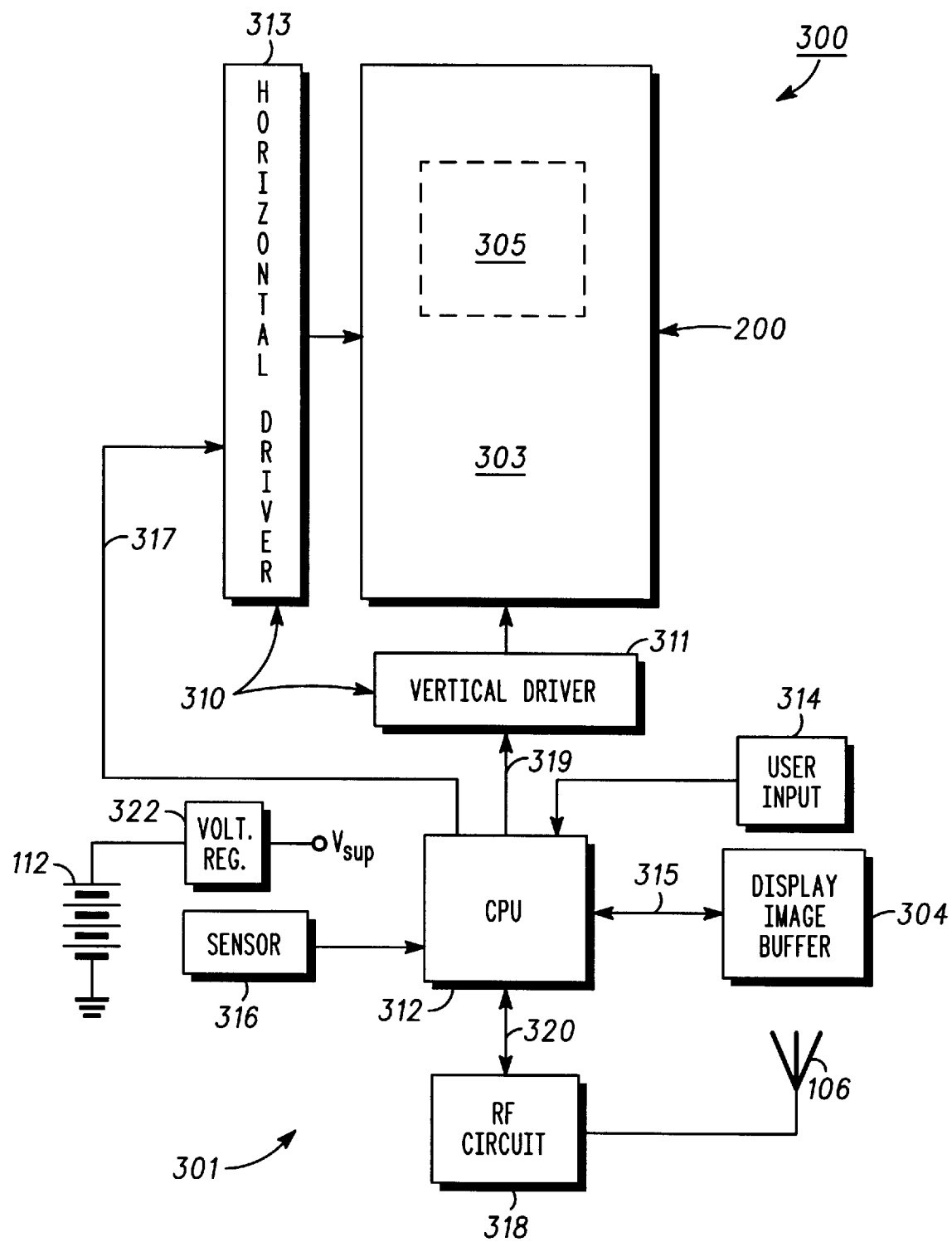
FIG. 3 is a circuit schematic in block diagram form illustrating a circuit in the device according to FIG. 1.
Figure 4:
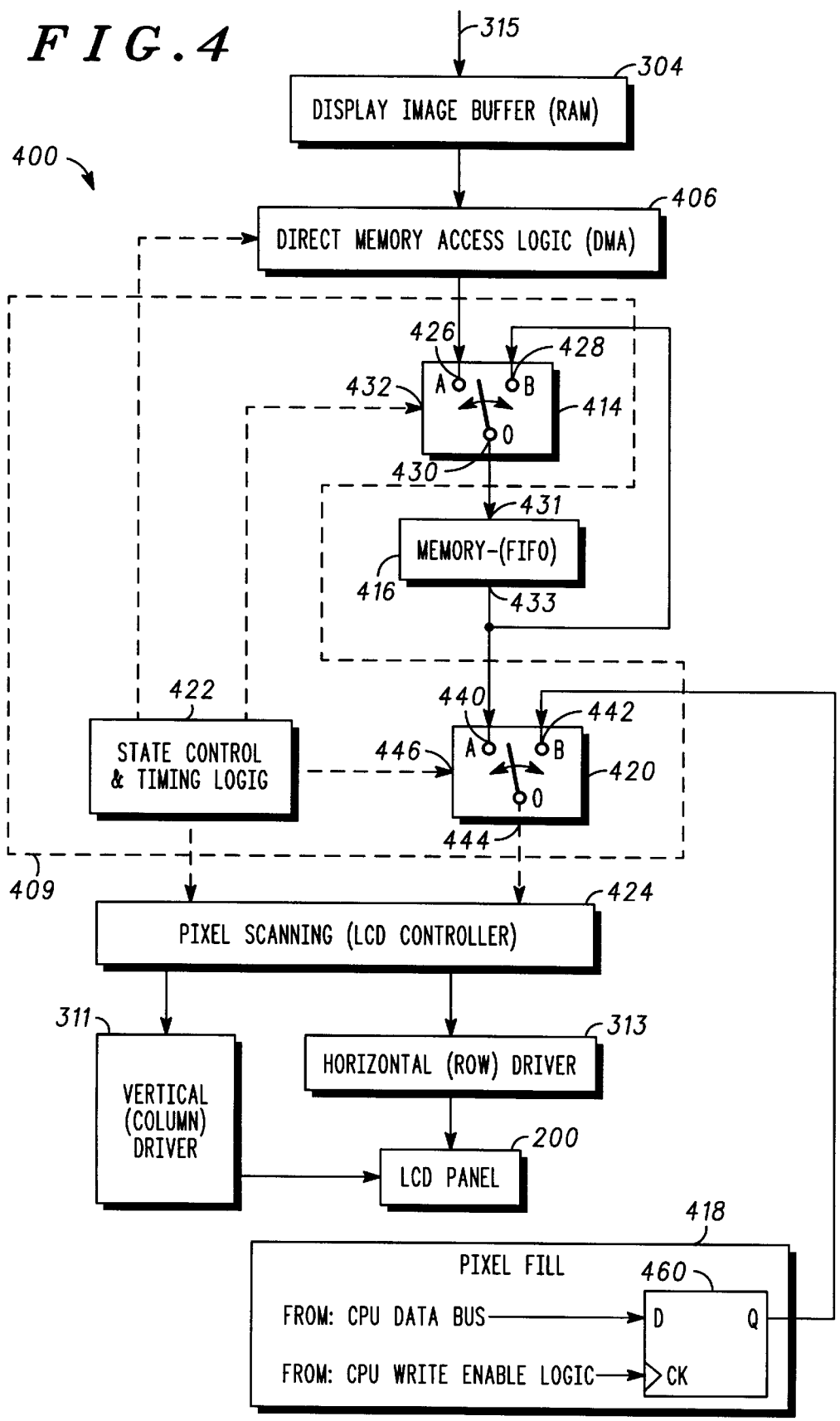
FIG. 4 is a circuit schematic in block diagram form illustrating a portion of the circuit according to FIG. 3.

With reference now to FIG. 4, the CPU 312 of FIG. 3 includes an image control circuit 400 having a direct memory access (DMA) channel 406, a control circuit 409, a first-in-first-out (FIFO) memory 416, and a pixel fill circuit 418. The control circuit 409 includes an input switch 414, an output switch 420, and state control and timing logic 422. The DMA channel 406 copies pixel control signals from the display image buffer. During times in which the core of CPU 312 is not employing the data bus 315 for operations other than operating the display, the DMA channel sequentially copies 4 bit pixel control signals from the display image buffer 304 and loads them into input switch 414. The DMA channel preferably has a bit width that matches the width of display image buffer 304, data bus 315 and FIFO memory 416. By using a wider bus, the number of total fetches to retrieve the pixel control signals for an image is reduced, which increases the opportunity that the CPU 312 has to access the memory for loading an image or for other purposes. This provides the highest likelihood of realizing smooth scrolling of images.

The input switch 414 has an input contact 426 connected to receive the sequential pixel control signals from the DMA channel 406 output. Another input contact 428 is connected to receive an output of the FIFO memory 416. A control input 432 receives a control signal responsive to which input contact 426 or input contact 428 is selected to be connected to an output 430 of output switch 420. The input switch 414 can be implemented using any suitable switching element, such as a digital switch employing logic gates, an analog switch using transistor elements, an electromechanical switch, software commands in the core of CPU 312, or the like.

The FIFO memory 416 receives the sequential pixel control signals from the output 430 of input switch 414 at an input 431. The FIFO memory 416 outputs signals at output 433 in the same order as they are received at input 431. The FIFO memory 416 contains "n" locations, where n is equal to the number of pixels of display panel 200 used in the partial display operating mode, which is the number of pixels in the partial display field 305. For example, each pixel control signal in FIFO memory 416 comprises 4 bits associated with a pixel having 15 gray scale levels. If the partial display field, or area, 305 has 120 pixels, the FIFO memory 416 has 120 locations of 4 bits each. By using a single bit per pixel, additional memory size savings can be achieved as the FIFO memory 416 need only store 120 locations of 1 bit each to generate an image over 120 pixels. It is envisioned that for the case when the cover 108 is closed, a monochrome image will be generated as the images are alphanumeric, such as text and phone numbers, which are well suited to a monochrome image.

The FIFO memory 416 is used to guarantee that a steady, continuous stream of pixel data is available for the pixel scanning controller 424 to insure that the image on the display panel 200 does not flicker. The DMA channel 406, which shares access privileges for the display image buffer 304 and the data bus 315 with the core of CPU 312, moves pixel control signals only while it has access to the data channel. The DMA channel loads the FIFO memory 416 at a rate faster than the contents are read out by pixel scanning controller 424 during these access periods. The FIFO memory 416 is thus loaded to prevent under-run by temporarily storing pixel elements in the full display operating mode. Under-run occurs when the buffer is not loaded with enough samples for the pixel scanning controller 424 to read, causing the pixel scanning controller to ignore pixels, which results in jumping during scrolling and image flicker. If for any reason the DMA channel doesn't supply a pixel control signal in a timely manner, the output of the FIFO memory 416 can be recirculated back to the input 431 by input switch 414.

In the partial image display mode, the input switch 414 is held in position b, wherein the input contact 428 is connected to the output 430. This allows the contents of the FIFO memory 416 to circulate while the DMA channel 406, and optionally the display image buffer 304, are disabled (powered down). This provides significant power savings in the partial display mode. In the partial display operating mode, the FIFO memory 416 thus stores all of the pixel control signals for the partial image.

The output switch 420 is identical to the input switch 414. It includes an input contact 440 connected to the output 433 of FIFO memory 416, an input contact 442 coupled to a pixel fill circuit 418 and an output 444 connected to pixel scanning controller 424. A control signal for controlling the position of output switch 420 is input at control input 446.

The pixel fill circuit 418 supplies a continuous stream of pixel samples all having the same value. The value of each pixel is selected to render a pixel off condition, which is a blank image, on the display panel 200 in the rows and columns of the display outside of the partial display field 305. A data flip-flop 460 has a data input connected to the CPU data bus to receive logic 0 and logic 1 signals therefrom. The clock input of the data flip-flop sets the register clock rate, and this input is connected to the CPU which provides a write enable signal thereto. The data flip-flop is programmed to output a sequence of zeros, ones, or a combination thereof, as required to produce a logic off signal for pixels of the display panel 200, by controlling the logic level at the D input to the data flip-flop. The rate at which pixel off signals are output is controlled by the register clock rate, such that the pixel fill circuit 418 can be controlled, or "programmed", according to the requirements of any commercially available display panel.

The actual value of the sample is programmable to accommodate different types of LCD driver circuits. The pixel fill circuit 418 can be implemented with a register storing a pixel off signal, such as a logic 0, which is output to the driver with each clock pulse. The register can be a clocked flip-flop as described above, a clocked register, or the like.

The state control and timing logic 422 comprises the logic for the generation of timing signals for the DMA channel and the pixel scanning controller 424, and coordinates the timely switching of the input switch 414 and the output switch 420. The timing state control and timing logic 422 controls the size and aspect ratio of the displayed image used in the partial display mode, and selection of the active operating mode, by controlling the input switch 414 and output switch 420. The state control and timing logic 422 can be implemented in the core of the CPU 312, in registers outside of the core, or the like. The pixel scanning controller can also include a small FIFO buffer (not shown) storing for example 16 bytes.

Pixel scanning is controlled by a pixel scanning controller 424. The pixel scanning controller 424 converts the pixel information supplied at the output 444 of output switch 420 into a signal for application to the horizontal driver 313 and vertical driver 311. The conversion process includes gray scale interpretation of the pixel signal used to control the duty cycle (on time/off-time) of the coded pixel data. Any conventional pixel scanning controller can be used to implement pixel scanning controller 424, such as commercially available LCD controllers or the like.

In operation, the display system operates in a partial display mode, wherein only partial display field 305 displays an image, and a full display mode, wherein the full display screen area 303 of display panel 200 displays an image. An image which occupies the entire display is stored in display image buffer 304. Smaller images that occupy only a portion of the display area are loaded into FIFO memory 416 just prior to initiation of the partial display mode.

The image in FIFO memory 416 is a two dimensional array with each element in the array representing a pixel. A pixel element in the array can represent up to 15 shades of grey. For the purposes of these description, the CPU 312 has ready access to the display image buffer and the image contained in the buffer is coded properly according to known techniques.

In the full display mode, the input switch 414 continues to connect input contact 426 and output 430. The DMA channel 406 is used to access the display image buffer 304 and deliver pixel signals, organized into groups of 8 or 16 bit words, to the input of FIFO memory 416 through the input switch 414. If 8 bit words are loaded, two pixel signals are loaded side by side. If 16 bit words are loaded, four pixel signals are loaded side-by side. Each time the FIFO memory 416 is half empty, the DMA channel 406 is signaled to retrieve additional samples from the display image buffer 304 and write these words into FIFO memory 416 until it is filled. The DMA channel 406 thus loads the FIFO memory 416 with sufficient data to avoid flickering. The DMA channel 406 is provided with the appropriate logic to access the samples from the image buffer in a linear and sequential manner and present these samples in sequential order to the FIFO memory 416.

The state control logic configures output switch 420 into position a, with input contact 440 connected to output 444, throughout the full display operating mode. The samples loaded into FIFO memory 416 by the DMA channel 406 advance towards the output side of the FIFO memory 416 as the pixel scanning controller 424 reads each sample from the FIFO memory 416 in succession.

The pixel scanning controller 424 receives a timing clock signal from the state control and timing logic 422 and uses the clock signal to convert the parallel pixel words from FIFO memory 416 into a sequential stream of pixel sets to be applied to the rows and columns of display panel 200 via horizontal driver 313 and vertical driver 311, respectively. Pixels which are coded for gray scale operation are processed to render a shade of grey appropriate with an assigned value by controlling the duty cycle of the coded pixel data as is known in the art. Intermediate shades of grey are produced by varying the pixel-on to pixel-off ratio for several frames. It will be recognized by those skilled in the art that the display contrast is achieved by varying the supply voltage responsive to ambient light sensors and ambient temperature detectors to thereby render the best contrast for indoor and outdoor lighting. In addition the pixel scanning controller 424 is programmed to signal the horizontal driver 313 and vertical driver 311 when a new horizontal line of pixels is being output or when the bottom of the display panel 200 has been reached the scanning process will restart from the top.

The partial display mode is activated by connecting the input switch 414 to the output of FIFO memory 416 such that the contents of the FIFO memory 416 is recirculated. The input switch 414 remains in this position throughout the partial display mode. The contents of the FIFO memory 416 is thus recirculated as it is systematically copied into the pixel scanning controller 424. This mode eliminates the necessity to operate the DMA channel 406 and the repeated DMA accesses to the large display image buffer 304. The DMA channel 406 and the display image buffer 304 can be powered down, which results in a considerable reduction in power consumption.

The input switch is moved from input contact 426 to input contact 428 when the first pixel of the first row to be displayed in the top of partial display field 305 is at the output of FIFO memory 416. This assures the image to be displayed recirculates and the desired partial display mode image is correct.

The aspect ratio of the image, which is the horizontal to vertical dimensions, is determined by logic provided in the state controller. The output switch 420 is controlled to connect the input contact 442 to the pixel fill circuit 418 during periods when the pixel scanning controller 424 is scanning the unused portions of the display panel. The output switch 420 thus acts as a combiner to combine the pixel off signals with the partial image pixel control signals to control all of the display screen area of display panel 200 during the partial display mode. Other combiners can be used in place of output switch 420, such as software control of the FIFO memory 416 and the pixel fill circuit 418 to insert signals onto a common bus in the appropriate order, or the like.

Use of the combiner, output switch 420, assures the region outside of partial display field 305 is controlled by the pixel fill bits, which are pixel off control signals. Scanning the display with pixel off signals protects the display panel 200 against plasma affect damage by insuring that an AC signal is applied to all pixels under all conditions of operation. Those skilled in the art will recognize that the pixel scanning controller 424 and drivers 311 and 313 provide an alternating voltage to the display panel 200 to insure that an AC voltage is always applied to the display panel 200.

The partial display mode provides energy conservation by reducing the power drawn by the display system 300. A pixel off code is scanned over the unused portion of the display to assure that the unused portion remains blank. The size of the partial display area is determined by the size of the FIFO memory 416 and the number of bits used to represent a single pixel element (i.e., the gray scale). Preferably 1 bit pixel words (monochrome) are used in the partial display mode to provide significant memory savings, and because the information displayed will be principally telephone number and text information which is well suited to monochrome display. The control of the blanked rows and columns and the insertion of the FIFO memory 416 pixels controls the location of the partial display field 305. By controlling the combination of pixel off signals with the contents of the FIFO memory 416 in the partial display mode, the image that is generated can be located in any region of the display. The rows and columns of the remainder of the display are controlled to be off thereby providing a reduction in power consumption.

Figure 5:
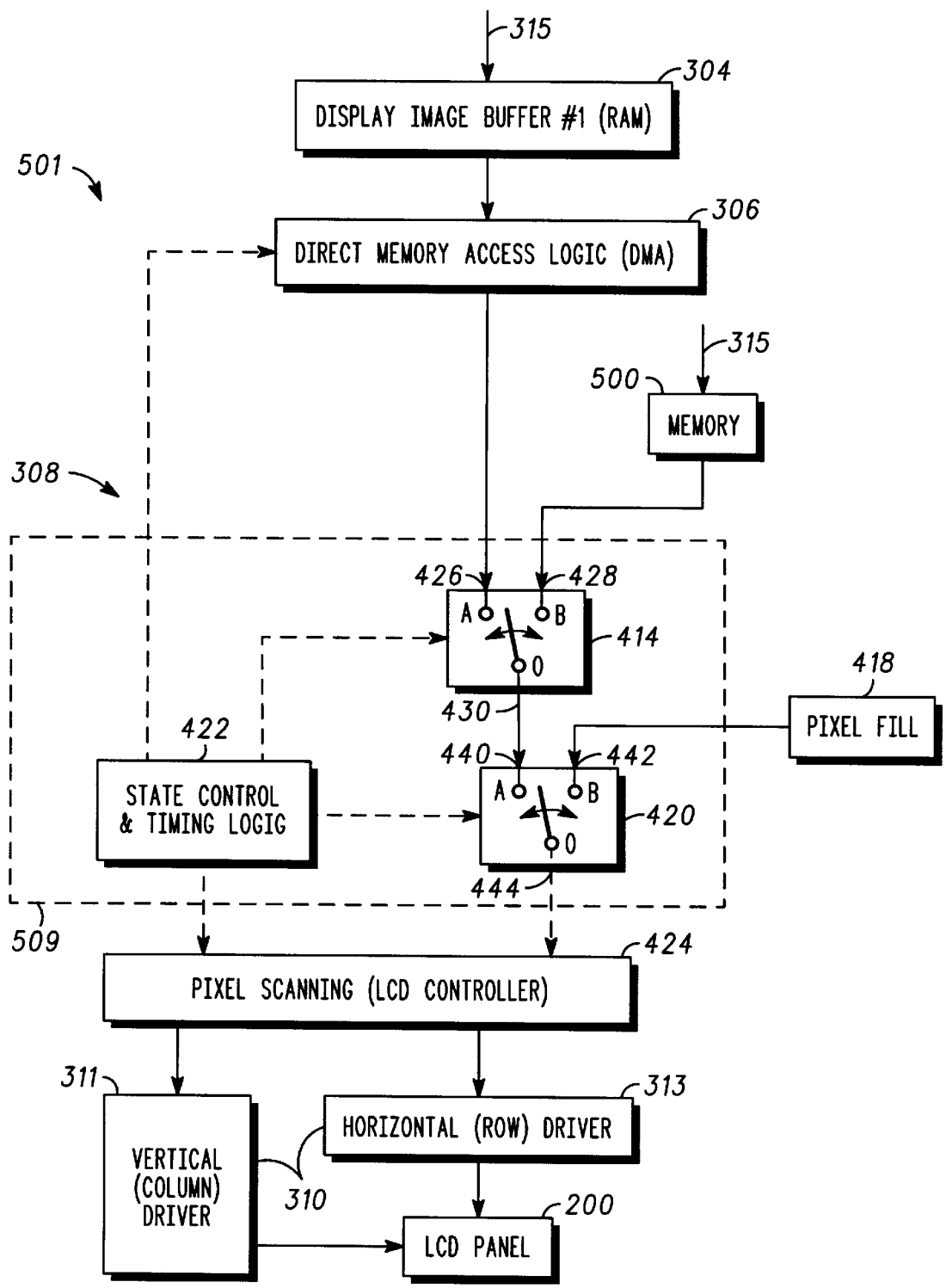
FIG. 5 is a circuit schematic illustrating an alternate embodiment of the circuit according to FIG. 4.

An alternate image control circuit 501 includes a partial image memory 500 (FIG. 5) and a control circuit 509. The partial image memory 500 is loaded with a partial image signal from CPU 312 on data bus 315. The partial image memory 500 can be implemented using any suitable memory device, such as static random access memory (SRAM).

In operation, the CPU 312 loads pixel control signals for the partial display field 305 into the partial image memory 500 via data bus 315 at the beginning of the partial display mode. The input contact 428 of input switch 414 is connected to the output of partial image memory 500. The partial image is then input to the pixel scanning controller 424 through output switch 420. The pixel control signals are read out in sequential order by increasing the address input to the partial image memory on each clock signal. The SRAM can for example be organized as 512 locations of 32 bits each. Each element stores a signal binary digit. In 1 bit/pixel mode (i.e., monochrome operation) this corresponds to 1 pixel per array element. If 4 bit gray scale is employed the image capable of being rendered is reduced by a factor of four. To blank those regions of the display outside of the partial display field 305, the output 444 of output switch 420 is connected to input contact 442, when the pixel scanning controller is reading pixel control signals for the rows and columns to be blank such that the pixel scanning controller receives the pixel off signal at the appropriate time. Those skilled in the art will recognize that the partial display field can be placed at any region of the full display screen area 303 by selecting the rows and columns to be controlled by the pixel off signal.

The pixel scanning controller 424 can include a DMA channel (not shown), for accessing the partial image memory 500, and a small FIFO buffer (not shown), used while unloading the contents of the partial image memory 500. The data bus 315 can for example be 16 bits wide, and the pseudo DMA channel can fetch eight 16 bit words at a time to copy into the small FIFO buffer. The pixel scanning controller 424 is responsive thereto to control the vertical driver 311 and horizontal driver 313 to display an image during the partial display mode.

The display control circuit 301 thus includes a first display image buffer 304 having capacity sufficient to store pixel control signals for controlling the image on the entire display screen of the display panel 200. A second display image buffer, FIFO memory 416 or partial image memory 500, has the capacity to hold an image for the partial display field 305. The second display image buffer is smaller than the first display image buffer. The state control and timing logic 422 controls the operation of the input switch 414 and output switch 420 such that the source of the image for the screen is switched from the first display image buffer to the second display image buffer in a synchronized manner. The pixel fill circuit 418 stores a pixel off signal controlling the portion of the display outside of the partial display field to be off.

The pixel off signal value can be selected to match the requirements of the display driver 310 and display panel 200. Additionally, the output switch 420 can be controlled so as to blank different rows and columns, thus changing the location of the partial display field 305. By changing the blanked columns and rows, the partial display field sourced from the second buffer can be placed in different areas of the display screen.

The partial display mode thus provides significant power savings, which is particularly important in battery powered devices. This power savings is accomplished without detrimentally impacting upon the operation of the display system in the full display operating mode.

We claim:

1. A display system comprising:
   a display having a display with a display screen area upon which images can be generated for viewing; and
   an image control circuit controlling operation of the display, the image control circuit controlling the display such that only a partial display area can be controlled to generate images in a first operating mode to conserve power and all of the display screen area can be controlled to generate images in a second operating mode;
   wherein the image control circuit includes a first buffer storing pixel control signals for the partial display area, and the first buffer passes image control signals through to a pixel scanning controller in the second operating mode, and stores pixel control signals for the partial display area in the first operating mode.

2. The display system as defined in claim 1, including a display image buffer storing pixel control signals for all of the display screen area.

3. The display system as defined in claim 1, wherein the first buffer is a first-in-first-out memory.

4. The display system as defined in claim 3, further including a switch connecting an output of the first-in-first-out memory to an input of the first-in-first-out memory to circulate pixel control signals in a partial display mode.

5. The display system as defined in claim 4, wherein the switch connects the output to the input when a first pixel control signal of an image to appear in the partial display area is at the output of the first-in-first-out memory.

6. A display system comprising:
   a display having a display with a display screen area upon which images can be generated for viewing; and
   an image control circuit controlling operation of the display, the image control circuit controlling the display such that only a partial display area can be controlled to generate images in a first operating mode to conserve power and all of the display screen area can be controlled to generate images in a second operating mode;
   wherein the image control circuit includes a first buffer storing pixel control signals for the partial display area, and an output of the first buffer is connected to a pixel scanning controller through a switch.

7. The display system as defined in claim 6 and further including a pixel fill circuit, the switch selectively connecting the pixel scanning controller to one of the output of the first buffer and an output of the pixel fill circuit, the pixel fill circuit generating pixel off signals, and the pixel off signals being input of the pixel scanning controller to select a location and size of the partial display area.

8. A battery powered device comprising:
   a display having a display screen area;
   a first display image buffer storing pixel control signals for all of the display screen area;
   a second display image buffer, the second display image buffer being smaller than the first display image buffer, wherein the second display image buffer has sufficient capacity to store pixel control signals for only a portion of the display screen area; and
   a control circuit to selectively provide pixel control signals from the first and second display image buffers to the display.

9. The battery powered device as defined in claim 8, wherein the control circuit includes a switch to selectively couple the second display image buffer to the first display image buffer.

10. The battery powered device as defined in claim 9, wherein the control circuit further includes a pixel fill circuit, the pixel fill circuit producing pixel off signals which are input to the display to blank the display screen area outside of the portion of the display screen area controlled by the second display image buffer.

11. The battery powered device as defined in claim 10, further comprising a register generating a value of the pixel off signals.

12. The battery powered device as defined in claim 10, wherein the control circuit includes a pixel scanning controller, the control circuit controlling insertion of the pixel off signals to the pixel scanning controller to blank rows and columns of pixels around the portion of the display screen area, and changing rows and columns of pixels that are to be blanked to relocate the portion of the display screen area in a new region of the display screen area.

13. The battery powered device as defined in claim 12 further including:
   a first housing portion, the first housing portion comprising the display;
   a second housing portion movingly carried on the first housing portion to move between an open and closed position, the second housing portion at least partially covering the first housing portion in the closed position; and
   the control circuit responsive to the first and second housing portions being in a closed position to display an image only in the portion of the display screen area.

14. The battery powered device as defined in claim 8, wherein the control circuit is responsive to inactivity to control the portion of the display screen area to be the only region of the display screen area to display images to thereby conserve battery power.

15. An image control circuit comprising:
   a pixel signal input;
   a memory storing pixel signals for a portion of a display screen;
   a pixel fill circuit outputting pixel off data; and
   a control circuit coupled to the pixel signal input, the memory and the pixel fill circuit, the control circuit including a combiner selectively combining the pixel signals from the memory and the pixel off data, the combiner outputting an image sequence received at the pixel signal input in a full image mode and outputting pixel off data and pixel signals from the memory in a partial display mode;
   further including a display image buffer storing pixel signals all of the display screen in a full display mode, the pixel signal input coupled to the display image buffer.

16. An image control circuit comprising:
   a pixel signal input;
   a memory storing pixel signals for a portion of a display screen;
   a pixel fill circuit outputting pixel off data; and
   a control circuit coupled to the pixel signal input, the memory and the pixel fill circuit, the control circuit including a combiner selectively combining the pixel signals from the memory and the pixel off data, the combiner outputting an image sequence received at the pixel signal input in a full image mode and outputting pixel off data and pixel signals from the memory in a partial display mode;

wherein the pixel fill circuit comprises a register storing pixel off signals.

17. The image control circuit as defined in claim 16, wherein the combiner comprises a first switch having an output, a first input coupled to the pixel fill circuit and a second input.

18. The image control circuit as defined in claim 17, wherein the control circuit further comprises a second switch having an output coupled to the second input of the first switch and an input coupled to the pixel signal input.

19. The image control circuit as defined in claim 18, further including a first-in-first-out buffer connected between the first switch and the second input of the second switch.

20. The image control circuit as defined in claim 18, further including a display image buffer coupled to another input of the second switch.

21. The image control circuit as defined in claim 18, wherein the control circuit further includes state control logic coupled to the first and second switches, the state control logic controlling a state of the first and second switches.

22. The image control circuit as defined in claim 21, further including a pixel scanning controller coupled to the output of the second switch and the state control logic.

23. The image control circuit as defined in claim 22, further including direct memory access channel coupled to the state control logic and the pixel signal input.

* * * * *